United States Patent
Park et al.

(10) Patent No.: US 10,647,847 B2
(45) Date of Patent: May 12, 2020

(54) THERMOPLASTIC RESIN COMPOSITION, METHOD OF PREPARING THE SAME, AND MOLDED PART MANUFACTURED USING THE SAME

(71) Applicant: LG CHEM, LTD., Seoul (KR)

(72) Inventors: Chun Ho Park, Daejeon (KR); Yong Yeon Hwang, Daejeon (KR); Hyun Taek Oh, Daejeon (KR); Bong Keun Ahn, Daejeon (KR); Min Jung Kim, Daejeon (KR); Eun Soo Kang, Daejeon (KR); Yong Hee An, Daejeon (KR); Jang Won Park, Daejeon (KR)

(73) Assignee: LG CHEM, LTD., Seoul (KR)

( * ) Notice: Subject to any disclaimer, the term of this patent is extended or adjusted under 35 U.S.C. 154(b) by 43 days.

(21) Appl. No.: 16/078,477

(22) PCT Filed: Dec. 5, 2017

(86) PCT No.: PCT/KR2017/014148
§ 371 (c)(1),
(2) Date: Aug. 21, 2018

(87) PCT Pub. No.: WO2018/124517
PCT Pub. Date: Jul. 5, 2018

(65) Prior Publication Data
US 2019/0023893 A1      Jan. 24, 2019

(30) Foreign Application Priority Data
Jan. 2, 2017   (KR) .................. 10-2017-0000097

(51) Int. Cl.
| | |
|---|---|
| C08L 51/04 | (2006.01) |
| C08L 33/14 | (2006.01) |
| C08L 25/12 | (2006.01) |
| C08L 33/20 | (2006.01) |
| C08L 25/14 | (2006.01) |
| B29B 11/10 | (2006.01) |

(52) U.S. Cl.
CPC .............. *C08L 51/04* (2013.01); *B29B 11/10* (2013.01); *C08L 25/12* (2013.01); *C08L 33/14* (2013.01); *C08L 33/20* (2013.01); *C08L 25/14* (2013.01); *C08L 2205/025* (2013.01); *C08L 2205/03* (2013.01)

(58) Field of Classification Search
CPC .......... C08L 51/04; C08L 33/14; C08L 25/12; C08L 25/14; C08L 2205/03
See application file for complete search history.

(56) References Cited

U.S. PATENT DOCUMENTS

| | | | |
|---|---|---|---|
| 3,944,631 A * | 3/1976 | Yu .................. | C08F 285/00 525/305 |
| 4,894,416 A | 1/1990 | Gallucci | |
| 6,395,828 B1 * | 5/2002 | Chang ................ | C08G 59/50 525/113 |
| 2004/0158009 A1 * | 8/2004 | Mays ................. | C08F 2/00 526/89 |
| 2009/0118412 A1 | 5/2009 | Mehta et al. | |
| 2013/0281569 A1 | 10/2013 | Hong et al. | |
| 2014/0187719 A1 * | 7/2014 | Kim .................. | C08L 69/00 525/74 |
| 2015/0247026 A1 * | 9/2015 | Shibata ............... | C08F 253/00 525/64 |

FOREIGN PATENT DOCUMENTS

| | | |
|---|---|---|
| CN | 101812223 A | 8/2010 |
| CN | 102010591 A | 4/2011 |
| KR | 1019960006624 B1 | 5/1996 |
| KR | 1020040039405 A | 5/2004 |
| KR | 1020050030643 A | 3/2005 |
| KR | 1020090095764 A | 9/2009 |
| KR | 100998875 B1 | 12/2010 |

OTHER PUBLICATIONS

European Search Report issued in related application No. EP17888907.7 dated Apr. 16, 2019.
International Search Report for PCT/KR2017/014148 dated Dec. 5, 2017.
Office Action dated Jan. 2, 2020 issued in related Chinese application No. 201780014715.4.

* cited by examiner

*Primary Examiner* — Jeffrey C Mullis

(57) ABSTRACT

The present invention relates to a thermoplastic resin composition, a method of preparing the same, and a molded part manufactured using the same. More specifically, the present invention provides a thermoplastic resin composition having excellent mechanical properties, such as tensile strength and impact strength, and weather resistance while having low gloss characteristics, a method of preparing the same, and a molded part manufactured using the same. According to the present invention, the thermoplastic resin composition includes an ASA graft copolymer having a core-shell structure having an average particle diameter of 0.05 to 1 μm, an aromatic vinyl compound-vinyl cyanide compound copolymer, and an epoxy group-containing copolymer having a weight average molecular weight of 2,000 to 8,000 g/mol in specific amounts.

14 Claims, No Drawings

THERMOPLASTIC RESIN COMPOSITION, METHOD OF PREPARING THE SAME, AND MOLDED PART MANUFACTURED USING THE SAME

CROSS-REFERENCE TO RELATED APPLICATION

This application is a U.S. National Stage of PCT/KR2017/014148 filed Dec. 5, 2017, which claims priority to Korean Patent Application No. 10-2017-0000097, filed on Jan. 2, 2017 in the Korean Intellectual Property Office, the disclosures of which are incorporated herein by reference.

TECHNICAL FIELD

The present invention relates to a thermoplastic resin composition having low gloss characteristics, a method of preparing the same, and a molded part manufactured using the same. More particularly, the present invention relates to a thermoplastic resin composition including an epoxy group-containing copolymer having a weight average molecular weight of 2,000 to 8,000 g/mol in a specific ratio. According to the present invention, the thermoplastic resin composition has excellent adhesive properties, mechanical properties, and weather resistance while having low gloss characteristics, and particularly has physical properties suitable for use in interior materials for buildings.

BACKGROUND ART

Acrylonitrile-butadiene-styrene (ABS) resins represented by acrylonitrile-butadiene-styrene terpolymers have excellent impact resistance, processability, mechanical strength, and heat resistance and also have an aesthetically pleasing appearance. Thus, ABS resins are used for various purposes in various fields, such as automobile parts, electrical and electronic products, and materials for buildings.

However, since ethylenically unsaturated polymers are present in a diene rubber used as an impact modifier in ABS resin, oxidation may easily occur in the resin due to ultraviolet light, light, and heat in the presence of oxygen, such that the appearance and color of the resin may be changed, and the mechanical properties of the resin may be deteriorated. Therefore, ABS resins are not suitable as exterior materials.

Therefore, when a thermoplastic resin having excellent physical properties, weather resistance, and aging resistance is prepared, ethylenically unsaturated polymers that are aged by ultraviolet light should not be present in the graft copolymer. Representative examples of resins meeting these requirements include acrylonitrile-styrene-acrylate (ASA) resins containing crosslinked alkyl acrylate rubber polymers. ASA resins have excellent weather resistance and aging resistance, and are used in various fields, such as automobiles, ships, leisure goods, building materials, and gardening goods.

In recent years, there has been growing interest in resins having excellent aesthetics, and accordingly, there is increasing demand for low-gloss resins. In particular, to satisfy consumers who prefer a luxurious appearance when purchasing interior materials for automobiles, exterior materials for electronic products, decorative sheets for furniture and buildings, and the like, it is necessary to develop products having low gloss and high adhesion properties.

To realize the above characteristics, post-processing, such as embossing the surface of a resin and coating the surface of a resin with a low-gloss material may be performed. However, when these methods are used, processing costs may be increased, and low gloss may be deteriorated due to wear during processing.

To realize a low gloss effect without a process such as the above-described matte coating, a method of scattering incident light by adjusting the smoothness of a resin to be larger than the wavelength range of visible light is mainly used. When preparing most low gloss resins, the following methods are used to lower gloss.

For example, a method of using a large-diameter conjugated diene rubber polymer having a particle diameter of $\mu$m or more, which is prepared by performing bulk polymerization, has been disclosed. Resins prepared by the method have good low gloss characteristics but have limitations in realizing excellent low gloss characteristics. In addition, when an excess of the large-diameter conjugated diene rubber polymer is added, physical properties, such as impact strength and weather resistance, may be deteriorated.

In addition, a method of adding a matte filler having a particle size of 5 $\mu$m or more to a resin has been proposed, but it has been difficult to realize excellent low gloss characteristics by such a method. In this case, when miscibility between the resin and the matte filler is insufficient, inherent physical properties of a resin, such as impact strength, may be significantly lowered.

As another example, there has been proposed a method of graft-polymerizing a copolymer such as an ethylene-unsaturated carboxylic acid copolymer as a modifier to an ABS polymer prepared by performing emulsion polymerization. Resins prepared using this method have excellent low gloss characteristics and good physical properties such as impact strength. Accordingly, the above method is most widely used to realize low gloss characteristics of a resin. However, the method is difficult to apply when a particular process is not ready, and even when the process is ready, there is a problem that process dependency is large, resulting in a cost problem.

PRIOR ART DOCUMENT

[Patent Document] (Patent Document 1) KR Patent No. 10-0998875 B1

DISCLOSURE

Technical Problem

Therefore, the present invention has been made in view of the above problems, and it is one object of the present invention to provide a thermoplastic resin composition and a method of preparing the same. When the thermoplastic resin composition is used to manufacture a molded part, the manufactured molded part may have excellent low gloss characteristics, mechanical properties, such as adhesive properties, tensile strength, and impact strength, and weather resistance.

It is another object of the present invention to provide a molded part including the thermoplastic resin composition and having excellent adhesive properties, mechanical properties, such as impact strength, and physical properties, such as weather resistance and appearance quality, while having low gloss characteristics. Particularly, the molded part may be suitable for use as interior materials for buildings.

The above and other objects can be accomplished by the present disclosure described below.

Technical Solution

In accordance with one aspect of the present invention, provided is a thermoplastic resin composition including A)

20 to 50% by weight of an ASA graft copolymer including an acrylic rubber core having an average particle diameter of 0.05 to 1 μm and a shell obtained by polymerizing an aromatic vinyl compound and a vinyl cyanide compound, wherein the core is wrapped with the shell; B) 49 to 79% by weight of an aromatic vinyl compound-vinyl cyanide compound copolymer; and C) 0.01 or more and less than 2% by weight of an epoxy group-containing copolymer having a weight average molecular weight of 2,000 to 8,000 g/mol, wherein the epoxy group-containing copolymer is obtained by polymerizing an epoxy group-containing vinyl compound and one or more selected from an aromatic vinyl compound, a vinyl cyanide compound, and an alkyl (meth)acrylate compound.

In accordance with another aspect of the present invention, provided is a method of preparing a thermoplastic resin composition including a step of kneading and extruding A) 20 to 50% by weight of an ASA graft copolymer including an acrylic rubber core having an average particle diameter of 0.05 to 1 μm and a shell obtained by polymerizing an aromatic vinyl compound and a vinyl cyanide compound, wherein the core is wrapped with the shell; B) 49 to 79% by weight of an aromatic vinyl compound-vinyl cyanide compound copolymer; and C) 0.01 or more and less than 2% by weight of an epoxy group-containing copolymer having a weight average molecular weight of 2,000 to 8,000 g/mol, wherein the epoxy group-containing copolymer is obtained by polymerizing an epoxy group-containing vinyl compound and one or more selected from an aromatic vinyl compound, a vinyl cyanide compound, and an alkyl (meth)acrylate compound.

In accordance with yet another aspect of the present invention, provided is a molded part manufactured by injection-molding the thermoplastic resin composition.

Advantageous Effects

As apparent from the foregoing, the present invention advantageously provides a thermoplastic resin composition having excellent adhesive properties, mechanical properties, such as tensile strength and impact strength, weather resistance, and appearance while having excellent low gloss characteristics. In particular, the thermoplastic resin composition has physical properties suitable for use as materials for buildings, such as decorative sheets.

BEST MODE

Hereinafter, the thermoplastic resin composition and the method of preparing the same, according to the present invention, will be described in detail.

The present inventors confirmed that, when a copolymer resin including an epoxy functional group is introduced to a resin composition including an ASA graft copolymer and an aromatic vinyl compound-vinyl cyanide compound copolymer, the inherent properties of ASA graft copolymers, such as mechanical properties and weather resistance, are maintained at a high level, and low gloss characteristics and adhesive properties are greatly improved. Based on these findings, the present inventors continued to further study and completed the present invention.

For example, the thermoplastic resin composition of the present invention includes A) 20 to 50% by weight of an ASA graft copolymer including an acrylic rubber core having an average particle diameter of 0.05 to 1 μm and a shell obtained by polymerizing an aromatic vinyl compound and a vinyl cyanide compound, wherein the core is wrapped with the shell; B) 49 to 79% by weight of an aromatic vinyl compound-vinyl cyanide compound copolymer; and C) 0.01 or more and less than 2% by weight of an epoxy group-containing copolymer having a weight average molecular weight of 2,000 to 8,000 g/mol, wherein the epoxy group-containing copolymer is obtained by polymerizing an epoxy group-containing vinyl compound and one or more selected from an aromatic vinyl compound, a vinyl cyanide compound, and an alkyl (meth)acrylate compound.

As another example, the thermoplastic resin composition of the present invention may include A) 25 to 45% by weight of the ASA graft copolymer; B) 54 to 74% by weight of the aromatic vinyl compound-vinyl cyanide compound copolymer; and C) 0.05 to 1.5% by weight of the epoxy group-containing copolymer. Within this range, the resin composition may have excellent low gloss characteristics and adhesive properties, and mechanical properties, such as impact strength, may be maintained at a high level.

As another example, the thermoplastic resin composition of the present invention may include A) 29.9 to 40% by weight of the ASA graft copolymer; B) 59.9 to 70% by weight of the aromatic vinyl compound-vinyl cyanide compound copolymer; and C) 0.1 to 0.8% by weight of the epoxy group-containing copolymer. In this case, the resin composition has excellent mechanical properties, such as adhesive properties and impact strength, and physical properties, such as appearance quality, while having excellent low gloss characteristics.

Hereinafter, each component included in the thermoplastic resin composition of the present invention will be described in detail.

A) ASA Graft Copolymer

The ASA graft copolymer of the present invention is a graft copolymer having a core-shell structure, in which an acrylic rubber core having an average particle diameter of 0.05 to 1 μm is wrapped with a shell obtained by polymerizing an aromatic vinyl compound and a vinyl cyanide compound.

For example, the ASA graft copolymer may include 10 to 60% by weight of the acrylic rubber core and 40 to 90% by weight of the shell obtained by polymerizing the aromatic vinyl compound and the vinyl cyanide compound. In this case, the inherent physical properties of ASA copolymers, such as mechanical strength and weather resistance, may be maintained at a high level.

As another example, the ASA graft copolymer may include 15 to 55% by weight of the acrylic rubber core and 45 to 85% by weight of the shell obtained by polymerizing the aromatic vinyl compound and the vinyl cyanide compound. In this case, mechanical strength, such as impact strength and tensile strength, and physical properties, such as weather resistance, may be improved.

The acrylic rubber core is a polymer containing an alkyl (meth)acrylate compound, and may include, for example, a polymer containing an alkyl (meth)acrylate compound having 1 to 8 carbon atoms in the alkyl group.

In the present invention, the alkyl (meth)acrylate compound includes alkyl methacrylate compounds, alkyl acrylate compounds, or mixtures thereof.

As a specific example, the alkyl (meth)acrylate compound may be one or more selected from the group consisting of methyl acrylate, ethyl acrylate, propyl acrylate, butyl acrylate, 2-ethylhexyl acrylate, methyl methacrylate, ethyl methacrylate, propyl methacrylate, and butyl methacrylate, preferably butyl acrylate.

For example, the acrylic rubber core may have an average particle diameter of 0.05 to 1 μm, more preferably 0.07 to 0.7 μm, most preferably 0.1 to 0.5 μm. Within this range, a finally manufactured resin composition may have excellent impact strength.

In the present invention, average particle diameters may be measured, for example, using a Nicomp 370HPL employing a dynamic light scattering technique.

For example, the shell of the ASA graft copolymer may be a copolymer obtained by polymerizing 60 to 80% by weight of the aromatic vinyl compound and 20 to 40% by weight of the vinyl cyanide compound. Within this range, the inherent physical properties of ASA copolymers may be maintained at a high level.

As another example, the shell of the ASA graft copolymer may include 65 to 75% by weight of the aromatic vinyl compound and 25 to 35% by weight of the vinyl cyanide compound. Within this range, a finally manufactured resin composition may have excellent mechanical properties, such as weather resistance and tensile strength.

In the present invention, unless specified otherwise, the aromatic vinyl compound may include one or more selected from the group consisting of styrene, alpha-methylstyrene, para-methylstyrene, 2,4-dimethylstyrene, and vinyl toluene, preferably styrene.

In the present invention, unless specified otherwise, the vinyl cyanide compound may include one or more selected from the group consisting of acrylonitrile, ethacrylonitrile, and methacrylonitrile, preferably acrylonitrile.

In addition, the shell of the ASA graft copolymer may include one or more selected from other monomeric compounds, for example, (meth)acrylic acid, alkyl (meth)acrylate, maleic anhydride, and N-substituted maleimide, which are capable of being copolymerized with the aromatic vinyl compound and the vinyl cyanide compound.

For example, the ASA graft copolymer may be prepared by performing conventional polymerization methods, such as bulk polymerization, solution polymerization, emulsion polymerization, and suspension polymerization, and emulsion polymerization is preferably used in consideration of increase in graft efficiency.

For example, the ASA graft copolymer may be contained in an amount of 20 to 50% by weight, preferably 29.9 to 40% by weight with respect to the total weight of the thermoplastic resin composition. Within this range, a rubber content is appropriate, so that a finally manufactured resin composition may have excellent mechanical properties, such as impact strength and tensile strength.

B) Aromatic Vinyl Compound-Vinyl Cyanide Compound Copolymer

The thermoplastic resin composition of the present invention includes an aromatic vinyl compound-vinyl cyanide compound copolymer as a matrix resin for the purpose of improving processability and moldability.

For example, the aromatic vinyl compound-vinyl cyanide compound copolymer is preferably prepared by polymerizing 60 to 80% by weight of the aromatic vinyl compound and 20 to 40% by weight of the vinyl cyanide compound, most preferably 68 to 73% by weight of the aromatic vinyl compound and 25 to 32% by weight of the vinyl cyanide compound. Within this range, a reaction balance during copolymerization is appropriate, so that the content of unreacted monomers may be reduced.

For example, the aromatic vinyl compound-vinyl cyanide compound copolymer may have a weight average molecular weight of 100,000 to 200,000 g/mol, preferably 120,000 to 200,000 g/mol, most preferably 120,000 to 180,000 g/mol. Within this range, a finally manufactured resin composition may have excellent physical properties, such as mechanical strength, and processability and moldability may be improved.

In the present invention, weight average molecular weights may be measured using, for example, gel permeation chromatography after dissolving resins in an organic solvent, such as THF.

When considering production costs, the aromatic vinyl compound-vinyl cyanide compound copolymer is preferably prepared by bulk polymerization, more preferably continuous bulk polymerization. In this case, an aromatic vinyl compound-vinyl cyanide compound copolymer having excellent polymerization stability and a high molecular weight may be finally prepared.

For example, based on the total weight of the thermoplastic resin composition, the aromatic vinyl compound-vinyl cyanide compound copolymer is preferably contained in an amount of 49 to 79% by weight, most preferably 59.9 to 70% by weight.

C) Epoxy Group-Containing Copolymer

When the epoxy group-containing copolymer of the present invention is used, a finally manufactured resin composition may have low gloss characteristics, and the adhesive properties of the resin may be improved.

The epoxy group-containing copolymer may be obtained by copolymerizing an epoxy group-containing vinyl compound and monomeric compounds capable of being copolymerized therewith. The monomeric compounds may include one or more selected from an aromatic vinyl compound, a vinyl cyanide compound, and an alkyl (meth) acrylate compound.

For example, the epoxy group-containing vinyl compound may be represented by Formula 1 below:

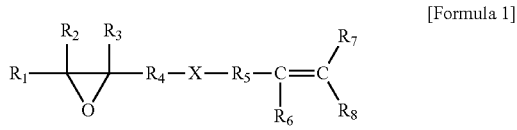

[Formula 1]

wherein R1, R2, R3, R6, R7, and R8 are the same or different from each other and are each independently selected from hydrogen, a saturated or unsaturated alkyl group having 1 to 12 carbon atoms, and a substituted or unsubstituted aryl group having 6 to 14 carbon atoms; X is selected from an ether group, a carboxyl group, an alkylene group having 1 to carbon atoms, and a substituted or unsubstituted arylene group having 6 to 14 carbon atoms; and R4 and R5 are the same or different from each other and are each independently selected from a bond, an alkylene group having 1 to 12 carbon atoms, and a substituted or unsubstituted arylene group having 6 to 14 carbon atoms.

As a specific example, the epoxy group-containing vinyl compound may be one or more selected from glycidyl alkyl (meth)acrylate, allyl glycidyl ether, aryl glycidyl ether, butadiene monoxide, vinyl glycidyl ether, and glycidyl itaconate, without being limited thereto.

For example, the aromatic vinyl compound may be one or more selected from styrene, alpha-methylstyrene, para-methylstyrene, beta-methylstyrene, para-t-butylstyrene, ethyl styrene, vinyl xylene, monochlorostyrene, dichlorostyrene, dibromostyrene, and vinylnaphthalene, preferably styrene.

For example, the vinyl cyanide compound may be one or more selected from saturated nitrile compounds, such as acrylonitrile, or unsaturated nitrile compounds, such as methacrylonitrile and ethacrylonitrile, preferably acrylonitrile.

For example, the alkyl (meth)acrylate compound may be one or more selected from methyl methacrylate, ethyl methacrylate, butyl methacrylate, methyl acrylate, ethyl acrylate, propyl acrylate, isopropyl acrylate, butyl acrylate, hexyl acrylate, octyl acrylate, and 2-ethylhexyl acrylate, preferably butyl acrylate.

For example, the epoxy group-containing copolymer may be obtained by polymerizing 10 to 20% by weight of the epoxy group-containing vinyl compound, 40 to 80% by weight of the aromatic vinyl compound, 0 to 30% by weight of the alkyl (meth)acrylate compound, and 0 to 20% by weight of the vinyl cyanide compound. In this case, compatibility between the ASA graft copolymer and the aromatic vinyl compound-vinyl cyanide compound copolymer may be improved. In addition, mechanical properties, such as impact strength, low gloss characteristics, and adhesive properties may be improved.

As another example, the epoxy group-containing copolymer may be obtained by polymerizing 10 to 20% by weight of the epoxy group-containing vinyl compound, 60 to 80% by weight of the aromatic vinyl compound, and 5 to 30% by weight of the alkyl (meth)acrylate compound. In this case, the resin composition may have excellent compatibility, the inherent mechanical properties of ASA thermoplastic resins, such as weather resistance, may be maintained at a high level, and low gloss characteristics and adhesive properties may be improved.

As a specific example, the epoxy group-containing copolymer may be represented by Formula 2 below:

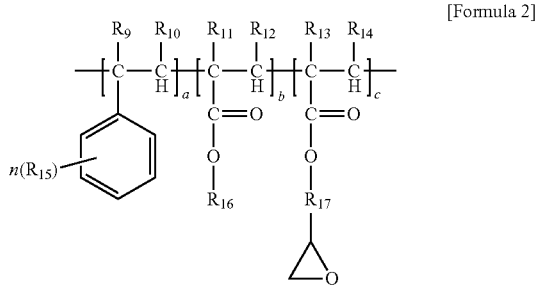

[Formula 2]

wherein $R_9$, $R_{10}$, $R_{11}$, $R_{12}$, $R_{13}$, $R_{14}$, $R_{15}$, and $R_{16}$ are the same or different from each other and are each independently hydrogen or an alkyl group having 1 to 20 carbon atoms; $R_{17}$ is a bond or an alkylene group having 1 to 20 carbon atoms; a is an integer of 60 to 80; b is an integer of 10 to 40; c is an integer of 1 to 30; and n is an integer of 1 to 5.

The epoxy group-containing copolymer preferably has a weight average molecular weight of 2,000 to 8,000 g/mol, 3,000 to 7,500 g/mol, 4,000 to 6,000 g/mol, or 6,000 to 8,000 g/mol. In this case, moldability and processability and physical properties, such as low gloss characteristics and adhesive properties, may be excellent.

For example, the epoxy group-containing copolymer may be contained in an amount of 0.01 or more and less than 2% by weight, 0.05 to 1.5% by weight, or 0.1 to 0.8% by weight with respect to the total weight of the thermoplastic resin composition. Within this range, the inherent mechanical properties of the ASA resin composition, such as impact strength and weather resistance, may be maintained at a high level, and low gloss characteristics and adhesion of the resin may be improved.

When necessary, the thermoplastic resin composition of the present invention may optionally further include additives. For example, the additives may be one or more selected from a flame retardant, an antimicrobial agent, an antistatic agent, an anti-dripping agent, a release agent, an antioxidant, a heat stabilizer, a lubricant, a UV stabilizer, an impact modifier, a filler, an inorganic additive, a stabilizer, a pigment, and a dye.

For example, the additive may be contained in an amount of 0.1 to 20 parts by weight, 0.1 to 10 parts by weight, or 0.5 to 5 parts by weight with respect to 100 parts by weight of the total composition composed of A) the ASA graft copolymer, B) the aromatic vinyl compound-vinyl cyanide compound copolymer, and C) the epoxy group-containing copolymer.

As a specific example, the thermoplastic resin composition of the present invention may further include 0.5 to 3 parts by weight of a lubricant, 0.1 to 1 part by weight of an antioxidant, and 0.1 to 1 part by weight of an UV stabilizer with respect to 100 parts by weight of the total composition composed of A) the ASA graft copolymer, B) the aromatic vinyl compound-vinyl cyanide compound copolymer and C) the epoxy group-containing copolymer. In this case, weather resistance of the resin composition may be further improved.

For example, the thermoplastic resin composition may be prepared by a method including a step of kneading and extruding A) 20 to 50% by weight of an ASA graft copolymer including an acrylic rubber core having an average particle diameter of 0.05 to 1 μm and a shell obtained by polymerizing an aromatic vinyl compound and a vinyl cyanide compound, wherein the core is wrapped with the shell; B) 49 to 79% by weight of an aromatic vinyl compound-vinyl cyanide compound copolymer; and C) 0.01 or more and less than 2% by weight of an epoxy group-containing copolymer having a weight average molecular weight of 2,000 to 8,000 g/mol.

When kneading is performed, one or more additives selected from a flame retardant, an antimicrobial agent, an antistatic agent, an anti-dripping agent, a release agent, an antioxidant, a heat stabilizer, a lubricant, a UV stabilizer, an impact modifier, a filler, an inorganic additive, a stabilizer, a pigment, and a dye may be further added.

For example, kneading and extruding may be performed at a temperature of 180 to 250° C. or 180 to 220° C., without being limited thereto.

In addition, a molded part may be manufactured from the thermoplastic resin composition of the present invention through an injection process.

When the thermoplastic resin composition includes the above-described epoxy group-containing copolymer in a specific content, the inherent physical properties of ASA thermoplastic resin compositions, such as weather resistance, impact strength, and tensile strength, may be excellent. In addition, low gloss characteristics and adhesion may be improved. Thus, the thermoplastic resin composition may be used in various fields, such as electrical/electronic products, automobile parts, materials for buildings, and the like. In particular, the composition may have physical properties suitable for use in interior/exterior materials for buildings and furniture, such as decorative sheets and extrusion sheets.

As a specific example, when gloss is measured at 60° according to ASTM D523, the molded part manufactured using the thermoplastic resin composition has a gloss of 25 or less, 20 or less, 5 to 20, or 5 to 15. These measurements indicate that the molded part has excellent low gloss characteristics.

In addition, when weather resistance (discoloration degree, ΔE) is measured and calculated according to the following conditions and method, the molded part has a weather resistance of 1.5 or less or 1.0 to 1.5. These measurements indicate that the molded part has excellent weather resistance.

In the present invention, weather resistance (discoloration degree, ΔE) is evaluated based on the arithmetic average values of CIE Lab color spaces before and after leaving a sheet manufactured by injection-molding a thermoplastic resin composition at 60° C. for 1,500 hours in accordance with ASTM D4355.

Hereinafter, the present invention will be described in more detail with reference to the following preferred examples. However, these examples are provided for illustrative purposes only and should not be construed as limiting the scope and spirit of the present invention. In addition, it will be apparent to those skilled in the art that various changes and modifications may be made without departing from the spirit and scope of the present invention, and such changes and modifications are also within the scope of the appended claims.

Materials used in the following examples and comparative examples are as follows.

A: an ASA graft copolymer having an average particle diameter of 300 nm and including a shell obtained by copolymerizing 40% by weight of styrene and 20% by weight of acrylonitrile onto 40% by weight of an acrylate rubber core B: a SAN resin having a MW of 150,000 g/mol, which is obtained by polymerizing 70% by weight of styrene and 30% by weight of acrylonitrile C1: an epoxy group-containing copolymer having a MW of 5,000 g/mol, which is obtained by polymerizing 12.7% by weight of butyl acrylate, 73.3% by weight of styrene, and 14.0% by weight of glycidyl methacrylate C2: an epoxy group-containing copolymer having a MW of 7,000 g/mol, which is obtained by polymerizing 14.6% by weight of butyl acrylate, 67.4% by weight of styrene, and 18.0% by weight of glycidyl methacrylate C3: as a control for the epoxy group-containing copolymer, an epoxy group-free copolymer having a MW of 2,000 g/mol, which is obtained by polymerizing 70% by weight of butyl acrylate, 20% by weight of methyl acrylate, and 10% by weight of 2-hydroxyl ethyl methacrylate D: a large-diameter ABS resin obtained by copolymerizing 40% by weight of styrene and 20% by weight of acrylonitrile onto 40% by weight of butadiene rubber having an average particle diameter of 3000 Å

EXAMPLES

Examples 1 to 4

Preparation of Thermoplastic Resin Composition 100 parts by weight of a base resin prepared according to the components and contents shown in Table 1 was mixed with 2 parts by weight of a lubricant, 0.3 parts by weight of an antioxidant, and 0.3 parts by weight of an UV stabilizer, and then a thermoplastic resin composition in the form of a pellet was prepared from the mixture using a 40 pi extrusion kneader under conditions of a cylinder temperature of 200° C. The thermoplastic resin composition was subjected to injection molding (injection temperature: 200° C.) to prepare specimens for measuring physical properties.

In addition, to measure gloss, a 0.3 mm thick sheet was prepared from the thermoplastic resin composition in the form of a pellet using a 40 pi sheet extruder under conditions of a cylinder temperature of 200° C.

COMPARATIVE EXAMPLES

Comparative Examples 1 to 5

Resin compositions were prepared in the same manner as that used in the above examples except that the components and contents shown in Table 2 were used.

Test Example

The properties of the specimens prepared according to the examples and the comparative examples were measured by the following methods, and the results are shown in Tables 1 and 2 below.

Izod impact strength (kgcm/cm): Izod impact strength was measured using ⅛" thick notched specimens at 23° C. according to ASTM D256.

Tensile strength (kg/cm$^2$): A specimen was pulled at a speed of 50 ram/min, and tensile strength at the breaking point was measured according to ASTM D638.

Gloss: Gloss was measured at a 60° angle using specimens for gloss measurement according to ASTM 523.

Weather resistance: Using a Weather-Omether (Ci4000), a weather resistance tester, specimens were allowed to stand at 60° C. for 1,500 hours, and then discoloration degree (ΔE) was measured using a color-difference meter. In this case, discoloration degree (ΔE) is calculated based on CIE Lab arithmetic average values before and after the weather resistance test. Weather resistance improves as the value of ΔE approaches 0.

Adhesion: Grid-like scratches were formed on the specimens, and the specimens were adhered with an adhesive tape and peeled off. Then, adhesion was evaluated according to the degree of peeling.

Very good: ⊚, Good: ○, Normal: Δ, Bad: x

Surface quality: Surface quality was evaluated by visually observing surface smoothness and occurrence of orange peels.

Good: ○, Normal: Δ, Bad: x

TABLE 1

| Classification | | Example 1 | Example 2 | Example 3 | Example 4 |
|---|---|---|---|---|---|
| Composition of base resin (parts by weight) | A | 35 | 35 | 35 | 30 |
| | B | 64.5 | 64.8 | 64.5 | 69.5 |
| | C1 | 0.5 | 0.2 | — | — |
| | C2 | — | — | 0.5 | 0.5 |
| | C3 | — | — | — | — |
| | D | — | — | — | — |
| Adhesion | | ⊚ | ○ | ⊚ | ⊚ |
| Impact strength (kgcm/cm) | | 6.9 | 6.5 | 8.8 | 6 |
| Tensile strength (kg/cm$^2$) | | 491 | 495 | 486 | 520 |
| Sheet gloss | | 11 | 24 | 6 | 12 |
| Surface quality | | ○ | ○ | ○ | ○ |
| Weather resistance (ΔE value) | | 1.2 | 1.0 | 1.1 | 1.1 |

TABLE 2

| Classification | | Comparative Example 1 | Comparative Example 2 | Comparative Example 3 | Comparative Example 4 | Comparative Example 5 |
|---|---|---|---|---|---|---|
| Composition of base resin (parts by weight) | A | 35 | 30 | 30 | 35 | 30 |
| | B | 65 | 67 | 68 | 64.5 | 65 |
| | C1 | — | 3.0 | — | — | — |
| | C2 | — | — | 2.0 | — | — |
| | C3 | — | — | — | 0.5 | — |
| | D | — | — | — | — | 5 |
| Adhesion | | X | ◎ | ◎ | Δ | Δ |
| Impact strength (kgcm/cm) | | 6.3 | 4.9 | 5.2 | 6.6 | 7.2 |
| Tensile strength (kg/cm$^2$) | | 501 | 510 | 505 | 494 | 526 |
| Sheet gloss | | 63 | 8 | 9 | 38.8 | 46 |
| Surface quality | | ○ | X | X | ○ | Δ |
| Weather resistance (ΔE value) | | 1.0 | 3.9 | 3.1 | 0.9 | 2.5 |

As shown in Table 1, the thermoplastic resin compositions (Examples 1 to 4) according to the present invention have excellent adhesion, mechanical properties, such as impact strength and tensile strength, weather resistance, and surface quality while having low gloss characteristics.

On the other hand, in the case of the thermoplastic resin compositions (Comparative Examples 1, 4, and 5) prepared without the epoxy group-containing copolymer, sheet gloss is high, and adhesion is poor and surface quality is somewhat lower than that of examples.

In addition, in the case of the thermoplastic resin composition (Comparative Example 5) containing the large-diameter ABS resin as a rubber dispersed phase, mechanical properties, such as impact strength, are excellent, but weather resistance is poor.

Further, in the case of the thermoplastic resin compositions (Comparative Examples 2 and 3) containing an excess of the epoxy group-containing copolymer, low gloss characteristics and adhesion are excellent, but impact strength is somewhat lowered, and surface quality and weather resistance are extremely poor.

The invention claimed is:

1. A thermoplastic resin composition, comprising:
   A) 20 to 50% by weight of an ASA graft copolymer comprising an acrylic rubber core having an average particle diameter of 0.05 to 1 μm and a shell obtained by polymerizing an aromatic vinyl compound and a vinyl cyanide compound, wherein the core is wrapped with the shell;
   B) 49 to 79% by weight of an aromatic vinyl compound-vinyl cyanide compound copolymer; and
   C) 0.01 or more and less than 2% by weight of an epoxy group-containing copolymer having a weight average molecular weight of 2,000 to 8,000 g/mol,
   wherein the epoxy group-containing copolymer is obtained by polymerizing an epoxy group-containing vinyl compound and one or more selected from an aromatic vinyl compound, a vinyl cyanide compound, and an alkyl (meth)acrylate compound,
   wherein the epoxy group-containing copolymer is represented by Formula 2 below:

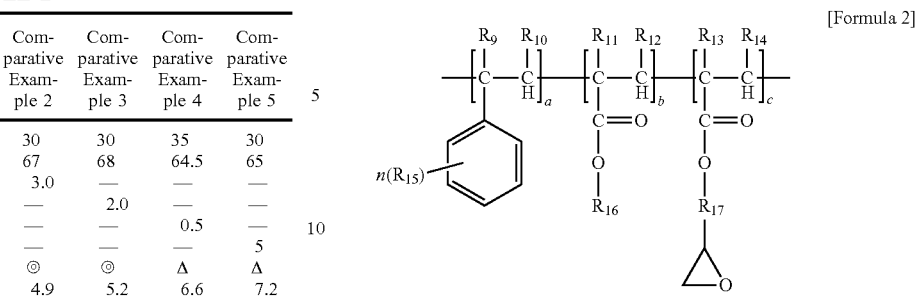

wherein $R_9$, $R_{10}$, $R_{11}$, $R_{12}$, $R_{13}$, $R_{14}$, $R_{15}$, and $R_{16}$ are the same or different from each other and are each independently hydrogen or an alkyl group having 1 to 20 carbon atoms; $R_{17}$ is a bond or an alkylene group having 1 to 20 carbon atoms; a is an integer of 60 to 80; b is an integer of 10 to 40; c is an integer of 1 to 30; and n is an integer of 1 to 5.

2. The thermoplastic resin composition according to claim 1, wherein the ASA graft copolymer comprises 10 to 60% by weight of the acrylic rubber core and 40 to 90% by weight of the shell obtained by polymerizing the aromatic vinyl compound and the vinyl cyanide compound.

3. The thermoplastic resin composition according to claim 2, wherein the shell of the ASA graft copolymer is obtained by polymerizing 60 to 80% by weight of the aromatic vinyl compound and 20 to 40% by weight of the vinyl cyanide compound.

4. The thermoplastic resin composition according to claim 1, wherein the aromatic vinyl compound-vinyl cyanide compound copolymer comprises 60 to 80% by weight of the aromatic vinyl compound and 20 to 40% by weight of the vinyl cyanide compound.

5. The thermoplastic resin composition according to claim 1, wherein the aromatic vinyl compound-vinyl cyanide compound copolymer has a weight average molecular weight of 100,000 to 200,000 g/mol.

6. The thermoplastic resin composition according to claim 1, wherein the epoxy group-containing copolymer is obtained by polymerizing 10 to 20% by weight of the epoxy group-containing vinyl compound, 40 to 80% by weight of the aromatic vinyl compound, 0 to 30% by weight of the alkyl (meth)acrylate compound, and 0 to 20% by weight of the vinyl cyanide compound.

7. The thermoplastic resin composition according to claim 6, wherein the epoxy group-containing copolymer is obtained by polymerizing 10 to 20% by weight of the epoxy group-containing vinyl compound, 60 to 80% by weight of the aromatic vinyl compound, and 5 to 30% by weight of the alkyl (meth)acrylate compound.

8. The thermoplastic resin composition according to claim 1, wherein the epoxy group-containing vinyl compound is represented by Formula 1 below:

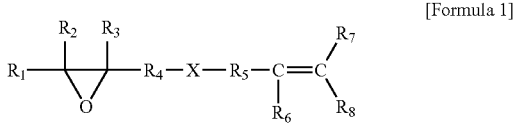

wherein $R_1$, $R_2$, $R_3$, $R_6$, $R_7$, and $R_8$ are the same or different from each other and are each independently selected from hydrogen, a saturated or unsaturated alkyl group having 1 to 12 carbon atoms, and a substituted or unsubstituted aryl group having 6 to 14 carbon atoms; X is selected from an ether group, a carboxyl group, an alkylene group having 1 to 12 carbon atoms, and a substituted or unsubstituted arylene group having 6 to 14 carbon atoms; and $R_4$ and $R_5$ are the same or different from each other and are each independently selected from a bond, an alkylene group having 1 to 12 carbon atoms, and a substituted or unsubstituted arylene group having 6 to 14 carbon atoms.

9. The thermoplastic resin composition according to claim 1, further comprising one or more additives selected from a flame retardant, an antimicrobial agent, an antistatic agent, an anti-dripping agent, a release agent, an antioxidant, a heat stabilizer, a lubricant, a UV stabilizer, an impact modifier, a filler, an inorganic additive, a stabilizer, a pigment, and a dye.

10. The thermoplastic resin composition according to claim 9, wherein the additive is contained in an amount of 0.1 to 20 parts by weight with respect to 100 parts by weight of the total composition composed of A) the ASA graft copolymer, B) the aromatic vinyl compound-vinyl cyanide compound copolymer, and C) the epoxy group-containing copolymer.

11. A method of preparing a thermoplastic resin composition, comprising:
    a step of kneading and extruding A) 20 to 50% by weight of an ASA graft copolymer comprising an acrylic rubber core having an average particle diameter of 0.05 to 1 μm and a shell obtained by polymerizing an aromatic vinyl compound and a vinyl cyanide compound, wherein the core is wrapped with the shell;
    B) 49 to 79% by weight of an aromatic vinyl compound-vinyl cyanide compound copolymer; and
    C) 0.01 or more and less than 2% by weight of an epoxy group-containing copolymer having a weight average molecular weight of 2,000 to 8,000 g/mol,
    wherein the epoxy group-containing copolymer is obtained by polymerizing an epoxy group-containing vinyl compound and one or more selected from an aromatic vinyl compound, a vinyl cyanide compound, and an alkyl (meth)acrylate compound,
    wherein the epoxy group-containing copolymer is represented by Formula 2 below:

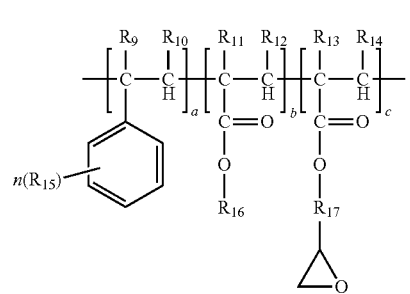

[Formula 2]

wherein $R_9$, $R_{10}$, $R_{11}$, $R_{12}$, $R_{13}$, $R_{14}$, $R_{15}$, and $R_{16}$ are the same or different from each other and are each independently hydrogen or an alkyl group having 1 to 20 carbon atoms;
$R_{17}$ is a bond or an alkylene group having 1 to 20 carbon atoms; a is an integer of 60 to 80; b is an integer of 10 to 40; c is an integer of 1 to 30; and n is an integer of 1 to 5.

12. A molded part manufactured by injection-molding the thermoplastic resin composition according to claim 1.

13. The molded part according to claim 12, wherein, when gloss is measured at 60° according to ASTM D523, the molded part has a gloss of 25 or less, and, when weather resistance (discoloration degree, ΔE) is measured according to ASTM D4355, the molded part has a weather resistance of 1.5 or less.

14. A molded part manufactured by injection-molding a thermoplastic resin composition comprising:
    A) 20 to 50% by weight of an ASA graft copolymer comprising an acrylic rubber core having an average particle diameter of 0.05 to 1 μm and a shell obtained by polymerizing an aromatic vinyl compound and a vinyl cyanide compound, wherein the core is wrapped with the shell;
    B) 49 to 79% by weight of an aromatic vinyl compound-vinyl cyanide compound copolymer; and
    C) 0.01 or more and less than 2% by weight of an epoxy group-containing copolymer having a weight average molecular weight of 2,000 to 8,000 g/mol,
    wherein the epoxy group-containing copolymer is obtained by polymerizing an epoxy group-containing vinyl compound and one or more selected from an aromatic vinyl compound, a vinyl cyanide compound, and an alkyl (meth)acrylate compound, and
    wherein, when gloss is measured at 60° according to ASTM D523, the molded part has a gloss of 25 or less, and, when weather resistance (discoloration degree, ΔE) is measured according to ASTM D4355, the molded part has a weather resistance of 1.5 or less.

* * * * *